United States Patent
Namie et al.

(10) Patent No.: US 12,117,785 B2
(45) Date of Patent: *Oct. 15, 2024

(54) CONTROL DEVICE, MODEL CREATION METHOD, AND CONTROL PROGRAM

(71) Applicant: OMRON Corporation, Kyoto (JP)

(72) Inventors: Masaki Namie, Takatsuki (JP); Yukio Iname, Kyoto (JP); Yoshimasa Usui, Kyoto (JP)

(73) Assignee: OMRON CORPORATION, Kyoto (JP)

(*) Notice: Subject to any disclaimer, the term of this patent is extended or adjusted under 35 U.S.C. 154(b) by 442 days.

This patent is subject to a terminal disclaimer.

(21) Appl. No.: 17/424,539

(22) PCT Filed: Jan. 23, 2020

(86) PCT No.: PCT/JP2020/002255
§ 371 (c)(1),
(2) Date: Jul. 21, 2021

(87) PCT Pub. No.: WO2020/162199
PCT Pub. Date: Aug. 13, 2020

(65) Prior Publication Data
US 2022/0066404 A1 Mar. 3, 2022

(30) Foreign Application Priority Data
Feb. 5, 2019 (JP) ................. 2019-018985

(51) Int. Cl.
*G05B 13/04* (2006.01)
(52) U.S. Cl.
CPC ................. *G05B 13/048* (2013.01)

(58) Field of Classification Search
None
See application file for complete search history.

(56) References Cited

U.S. PATENT DOCUMENTS 8,082,048 B2 * 12/2011 Eguchi ............. G05B 19/404
318/560
2012/0187891 A1 7/2012 Ueda et al.
(Continued)

FOREIGN PATENT DOCUMENTS

CN 102510253 A 6/2012
CN 102549515 A 7/2012
(Continued)

OTHER PUBLICATIONS

Office Action dated Feb. 26, 2023 from the Korean Patent Office in Application No. 10-2021-7023108.
(Continued)

*Primary Examiner* — David Earl Ogg
(74) *Attorney, Agent, or Firm* — Sughrue Mion, PLLC

(57) ABSTRACT

A control device includes a control component that performs model predictive control for each control period using a dynamics model representing a relationship between a manipulated variable and the position of a controlled object to generate a manipulated variable to be output to the servo driver. The dynamics model includes a first dynamics model representing a relationship between the manipulated variable and a position of a servomotor, and a second dynamics model representing a relationship between the position of the servomotor and the position of the controlled object. The second dynamics model is created using a waveform parameter extracted from a vibration waveform of the controlled object. The waveform parameter includes a vibration frequency.

16 Claims, 10 Drawing Sheets

(56) References Cited

U.S. PATENT DOCUMENTS

| | | | |
|---|---|---|---|
| 2013/0234642 A1 | | 9/2013 | Igarashi et al. |
| 2017/0277150 A1* | | 9/2017 | Nakamura ............ G05B 19/048 |
| 2018/0210407 A1* | | 7/2018 | Namie ................ G05B 13/041 |
| 2018/0267486 A1* | | 9/2018 | Manabe ............... G05B 13/048 |

FOREIGN PATENT DOCUMENTS

| | | | |
|---|---|---|---|
| CN | 102880772 A | | 1/2013 |
| CN | 103270692 A | | 8/2013 |
| CN | 105450146 A | | 3/2016 |
| CN | 105871281 A | | 8/2016 |
| FR | 3 030 148 A1 | | 6/2017 |
| JP | 4-205604 A | | 7/1992 |
| JP | 10-323070 A | | 12/1998 |
| JP | 2003-274684 A | | 9/2003 |
| JP | 2005339503 A | * | 12/2005 |
| JP | 2014-127101 A | | 7/2014 |
| JP | 2017-175890 A | | 9/2017 |
| JP | 2018-120327 A | | 8/2018 |
| JP | 2018-151899 A | | 9/2018 |
| KR | 10-2013-0046883 A | | 5/2013 |

OTHER PUBLICATIONS

Atsushi Matsubara et al., "Model-reference feedforward controller design for high-accuracy contouring control of machine tool axes", CIRP Annals—Manufacturing Technology, 2011, vol. 60, pp. 415-418 (4 total pages).

Rolf Isermann et al., "Identification of Dynamic Systems", Springer, 2011, pp. VI-705 (710 total pages).

Extended European Search Report dated Sep. 29, 2022 in European Application No. 20752882.9.

L. Bossi et al., "Multivariable predictive control for vibrating structures: An application", Control Engineering Practice, 2011, vol. 19, pp. 1087-1098 (12 pages total).

International Search Report for PCT/JP2020/002255 dated Mar. 17, 2020 (PCT/ISA/210).

Written Opinion for PCT/JP2020/002255 dated Mar. 17, 2020 (PCT/ISA/237).

Imre Benyo, "Cascade Generalized Predictive Control—Applications in Power Plant Control," Acta Universitatis Ouluensis, C Technica 236, Apr. 28, 2006, Dissertation (163 pages total).

Korean Office Action issued Aug. 29, 2023 in Application No. 10-2021-7023108.

Ge Baoming et al., "AC Position Servo System-controlled by Model Algorithmic Control", Aug. 30, 2001 (4 pages).

Marcin Cychowski, et al., "Constrained Model Predictive Control of the Drive System with Mechanical Elasticity", IEEE Transactions of Industrial Electronics, vol. 56, No. 6, Jun. 2009, pp. 1963-1973 (11pages).

Chinese Office action dated Oct. 12, 2023 in Application No. 202080010194.7.

Pan Feng, et al., "Research on Direct Torque Control for Permanent Magnet Synchronous Motor Based on the Double Sliding Mode", Transactions of China Electrotechnical Society, Dec. 2018, vol. 33, No. 2, DOI: 10.19595/j.cnki. 1000-6753.tces. 180588, pp. 427-433 (7 pages).

Srinivas Pratapgiri, "Hysteresis Current Control of Switched Reluctance Motor Using Three Term Inductance Model ",IEEE, Dec. 31, 2016, Beijing University of Post and Telecom (6 pages).

Dale E. Seborg, et al., "Process Dynamics and Control", Wiley, 4th edition, pp. 1-502 (p. 515).

Korean Office Action dated May 28, 2024 in Application No. 10-2021-7023108.

Chinese Office Action dated Apr. 21, 2024 in Application No. 202080010194.7.

* cited by examiner

CONTROL DEVICE, MODEL CREATION METHOD, AND CONTROL PROGRAM

CROSS REFERENCE TO RELATED APPLICATIONS

This application is a National Stage of International Application No. PCT/JP2020/002255 filed Jan. 23, 2020, claiming priority based on Japanese Patent Application No. 2019-018985 filed Feb. 5, 2019, the entire contents of each of which being herein incorporated by reference in their entireties.

TECHNICAL FIELD

The present technology relates to a control device, a model creation method, and a control program.

BACKGROUND ART

Japanese Patent Laid-Open No. 2017-175890 (PTL 1) discloses a motor controller including a position command unit for commanding the position of a driven unit, a compensation filter unit for compensating for a position command, and a servo control unit for controlling the operation of a servomotor based on a compensated position command. The compensation filter unit includes an inverse characteristic filter for approximating an inverse characteristic of a transfer characteristic from a motor position to a mechanical position.

CITATION LIST

Patent Literature

PTL 1: Japanese Patent Laid-Open No. 2017-175890
PTL 2: Japanese Patent Laid-Open No. 2018-120327

SUMMARY OF INVENTION

Technical Problem

The motor controller disclosed in PTL 1 uses the inverse characteristic filter to generate a position command to cause the mechanical position to track a target position even when the mechanical position cannot be measured. In general, however, a response delay occurs in the servo control unit, and vibration damping for the mechanical position is easily reduced and the mechanical position tends to poorly track the target position. In particular, for a vibratable, low-rigidity machine, the servo control unit cannot have an increased gain, and response delay in the servo control unit tends to increase.

The present invention has been made in view of the above problem, and an object of the present invention is to provide a control device and control program capable of better damping vibration for the position of a controlled object and allowing the controlled object to positionally better track a target trajectory, and a model creation method for creating a model used by the control device.

Solution to Problem

According to an example of the present disclosure, a control device is connected to a servo driver configured to drive a servomotor configured to move a controlled object, and is configured to output a manipulated variable to the servo driver to control a position of the controlled object. The control device includes a control means configured to perform model predictive control for each control period using a dynamics model representing a relationship between a manipulated variable and the position of the controlled object to generate a manipulated variable to be output to the servo driver. The dynamics model includes a first dynamics model representing a relationship between the manipulated variable and a position of a servomotor, and a second dynamics model representing a relationship between the position of the servomotor and the position of the controlled object. The second dynamics model is created using a waveform parameter extracted from a vibration waveform of the controlled object. The waveform parameter includes a vibration frequency.

According to the present disclosure, a second dynamics model representing a relationship between the position of the servomotor and the position of the controlled object can be created by measuring the vibration waveform of the controlled object. A first dynamics model is easily created using a feedback value received from the servomotor. The first dynamics model and the second dynamics model can be combined together to create a dynamics model representing a relationship between the manipulated variable and the position of the controlled object. The created dynamics model is used to perform model predictive control to generate a manipulated variable, which allows the controlled object's position to track the target trajectory and can better damp vibration for the position of the controlled object.

In the above disclosure, the waveform parameter further includes an amplitude ratio of two successive waves in the vibration waveform.

According to the present disclosure, a second dynamics model closer to the controlled object can be created, and the position of the controlled object is predicted with better accuracy.

In the above disclosure, the control means inputs a manipulated variable generated before the current control period to the first dynamics model to calculate a predicted position of the servomotor. The control means inputs the predicted position of the servomotor to the second dynamics model to calculate a predicted position of the controlled object for a future control period elapsing since the current control period ends by a dead time defined in the dynamics model. The control means uses the predicted position of the controlled object and the dynamics model to generate a manipulated variable to be output to the servo driver in a subsequent control period so as to minimize a deviation from a target trajectory of a position assumed by the controlled object in the future control period et. seq.

According to the present disclosure, the control means can use the first and second dynamics models to easily calculate a predicted position of the controlled object from a manipulated variable generated before the current control period. And model predictive control can be performed to cause the controlled object to positionally track the target trajectory.

In the above disclosure, the control means may compensate for the predicted position of the servomotor based on a feedback value received from the servomotor.

According to the present disclosure, a predicted position of the servomotor is compensated for based on a feedback value, and the position of the controlled object is predicted with better accuracy.

In the above disclosure, the control means includes: an output means configured to output a characteristic parameter which defines the first dynamics model; and a generation means configured to receive the characteristic parameter and the waveform parameter and generate the manipulated variable to be output to the servo driver.

Alternatively, the control means may include: an output means configured to receive the waveform parameter and output a characteristic parameter which defines a dynamics model composed of the first and second dynamics models combined together; and a generation means configured to receive the characteristic parameter and generate the manipulated variable to be output to the servo driver.

Alternatively, the control means may include: an output means configured to output a characteristic parameter which defines the first dynamics model, and receive a measured position of the controlled object and output the waveform parameter; and a generation means configured to receive the characteristic parameter and the waveform parameter and generate the manipulated variable to be output to the servo driver.

Further, the control device includes a processor configured to execute a user program. The output means and the generation means are implemented by a function block defined in the user program.

According to the present disclosure, the function block can be used to easily implement the output means and the generation means.

According to one example of the present disclosure, a model creation method for creating the second dynamics model used by the control device comprises: obtaining a vibration waveform of a controlled object; extracting a waveform parameter from the vibration waveform; and generating the second dynamics model using the waveform parameter. The waveform parameter includes a vibration frequency.

According to an example of the present disclosure, a control program is executed in a control device connected to a servo driver configured to drive a servomotor configured to move a controlled object, and configured to output a manipulated variable to the servo driver to control a position of the controlled object. The control program causes the control device to: generate a first dynamics model representing a relationship between the manipulated variable and a position of the servomotor; use a waveform parameter extracted from a vibration waveform of the controlled object to generate a second dynamics model representing a relationship between the position of the servomotor and a position of the controlled object; and use the first and second dynamics models to perform model predictive control for each control period to generate a manipulated variable to be output to the servo driver. The waveform parameter includes a vibration frequency.

According to these disclosures as well, vibration damping for the position of the controlled object can be improved and the controlled object can positionally better track a target position.

Advantageous Effects of Invention

The present invention can thus better damp vibration for the position of the controlled object and allows the controlled object to positionally better track a target position.

DESCRIPTION OF EMBODIMENTS

An embodiment of the present invention will now be described in detail with reference to the drawings. Note that in the figures, identical or corresponding components are identically denoted, and accordingly, will not be described repeatedly.

§ 1. Exemplary Application

Figure 1:
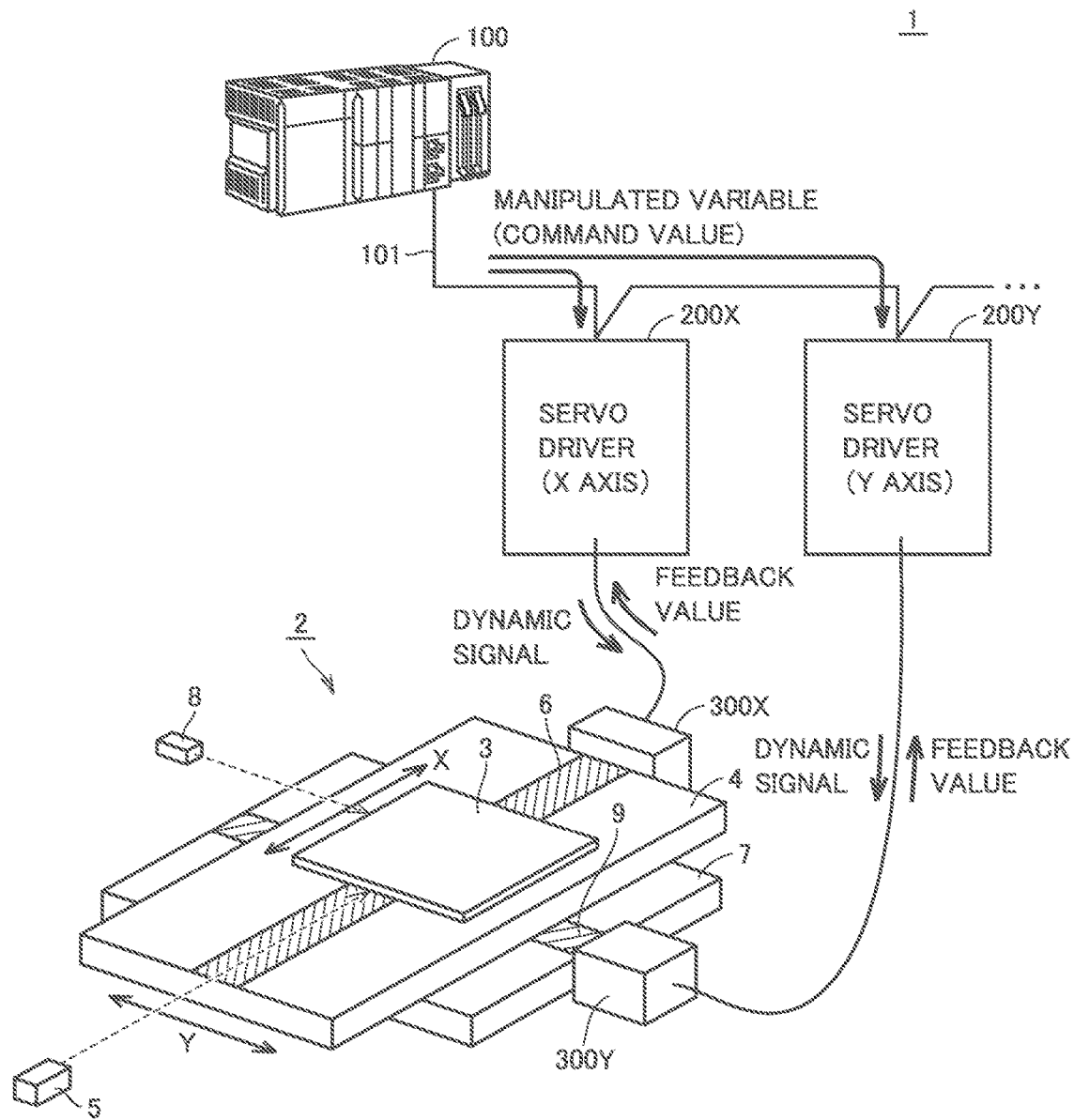
FIG. 1 is a schematic diagram showing a configuration example of a control system to which a control device according to an embodiment is applied.

Initially, an example of a scenario in which the present invention is applied will be described with reference to FIG. 1. FIG. 1 is a schematic diagram showing a configuration example of a control system to which a control device according to the present embodiment is applied. FIG. 1 exemplarily shows a control system 1 including a controlled object 2, a control device 100, one or more servo drivers, and one or more servomotors.

Controlled object 2 in the example shown in FIG. 1 is an XY stage capable of moving a working plate 3 in two directions orthogonal to each other with a workpiece disposed thereon. Controlled object 2 is not limited to the XY stage, and may be a device positioned at a designated position (a stationary position).

One or more servomotors are motors configured to move controlled object 2, including working plate 3, and in the example shown in FIG. 1, include two servomotors 300X and 300Y (hereinafter also referred to as servomotor 300).

Controlled object 2 includes a first base plate 4 and a second base plate 7 in addition to working plate 3.

First base plate 4 is provided with a ball screw 6 to move working plate 3 in the X direction, as desired. Ball screw 6 is engaged with a nut included in working plate 3. When servomotor 300X connected to one end of ball screw 6 is driven and thus rotated, the nut included in working plate 3 and ball screw 6 rotate relative to each other, and as a result, working plate 3 will move in the X direction.

Further, second base plate 7 is provided with a ball screw 9 to move working plate 3 and first base plate 4 in the Y direction, as desired. Ball screw 9 is engaged with a nut included in first base plate 4. When servomotor 300Y connected to one end of ball screw 9 is driven and thus rotated, the nut included in first base plate 4 and ball screw 9 rotate relative to each other, and as a result, working plate 3 and first base plate 4 will move in the Y direction.

The one or more servo drivers drive the servomotors. In the example shown in FIG. 1, two servo drivers 200X and 200Y (hereinafter also referred to as "servo driver 200") drive servomotors 300X and 300Y, respectively.

Servo driver 200 generates a drive signal for the associated servomotor 300 based on a command value (a command position or a command speed) received from control device 100 and a feedback value received from the associated servomotor 300. Servo driver 200 outputs the generated operation signal to servomotor 300 to drive servomotor 300.

For example, servo driver 200 receives as the feedback value a signal output from an encoder coupled to the rotation shaft of the associated servomotor 300. Servomotor 300's position, rotational phase, rotational speed, cumulative rotational speed, and the like can be detected from the feedback value.

Control device 100 is connected to one or more servo drivers 200, and outputs a manipulated variable to each of one or more servo drivers 200 to positionally control controlled object 2 including working plate 3. Control device 100 and one or more servo drivers 200 can communicate data including the manipulated variable.

FIG. 1 shows a configuration example in which control device 100 and one or more servo drivers 200 are connected via a field bus 101. However, such a configuration example is not exclusive, and any communication means may be employed. Alternatively, control device 100 and servo driver 200 may be directly connected by a signal line. Further, control device 100 and servo driver 200 may be integrated together. Any implementation may be employed insofar as an algorithm is implemented as will be described below.

Control device 100 performs model predictive control using a dynamics model representing a relationship between a manipulated variable and the position of controlled object 2 to generate a manipulated variable to be output to servo driver 200. Control device 100 outputs the generated manipulated variable to servo driver 200 as a command value (a command position or a command speed). The dynamics model is a model of servo driver 200, servomotor 300, and controlled object 2, and is defined by a transfer function representing a relationship between a manipulated variable (that is, a command value) as an input value and a load position as an output value. Model predictive control is a control method for determining an input value so that a deviation from a target value of an output value predicted using a model is minimized.

If a measured value obtained by continuously and highly accurately measuring the load position can be acquired, the transfer function between the manipulated variable and the load position can be directly created. However, continuously and highly accurately measuring the load position requires cost. Accordingly, control device 100 of the present embodiment performs model predictive control using a first dynamics model representing a relationship between the manipulated variable and the position of servomotor 300 (hereinafter referred to as a "motor position") and a second dynamics model representing a relationship between the motor position and the load position.

The first dynamics model is a model of servo driver 200 and servomotor 300, and is defined by a transfer function representing a relationship between a manipulated variable as an input value and a motor position as an output value. Generally, servomotor 300 is provided with an encoder, and the motor position is continuously and highly accurately measured by a feedback value received from the encoder. Accordingly, the first dynamics model is created based on the measured value of the motor position.

The second dynamics model is a model of controlled object 2, and is defined by a transfer function representing a relationship between a motor position as an input value and a load position as an output value. The motor position and the load position has a relationship depending on the vibration of controlled object 2. Accordingly, the second dynamics model is created using a waveform parameter extracted from the vibration waveform of controlled object 2. The waveform parameter includes a vibration frequency (typically, an eigenfrequency) of controlled object 2.

The vibration waveform of controlled object 2 can be measured using a simple measuring instrument. In the example shown in FIG. 1, the vibration waveform of controlled object 2 is measured using laser displacement meters 5 and 8. Laser displacement meter 5 measures displacement of that end face of working plate 3 which is orthogonal to the X direction. A vibration waveform of working plate 3 in the X direction can be obtained from the measurement result of laser displacement meter 5. Laser displacement meter 8 measures displacement of that end face of working plate 3 which is orthogonal to the Y direction. A vibration waveform of working plate 3 in the Y direction can be obtained from the measurement result of laser displacement meter 8. The vibration waveform may be measured using a sensor other than the laser displacement meter.

Thus, a simple measuring instrument can be used to measure the vibration waveform of controlled object 2 to create the second dynamics model representing the relationship between the motor position and the load position. Then, by combining the first and second dynamics models together, a dynamics model representing a relationship between the manipulated variable (that is, the command value) and the load position can be created. The created dynamics model can be used to perform model predictive control to generate a manipulated variable, and the load position can be caused to track a target trajectory and vibration damping for the load position can be improved.

§ 2. Specific Example

A specific example of control device 100 according to the present embodiment will now be described.

<A. Exemplary Hardware Configuration of Control Device>

Control device 100 according to the present embodiment may be implemented using a PLC (programmable controller), for example. Control device 100 may implement processing, as will be described below, by a processor executing a control program (including a system program and a user program, as will be described hereinafter) stored previously.

Figure 2:
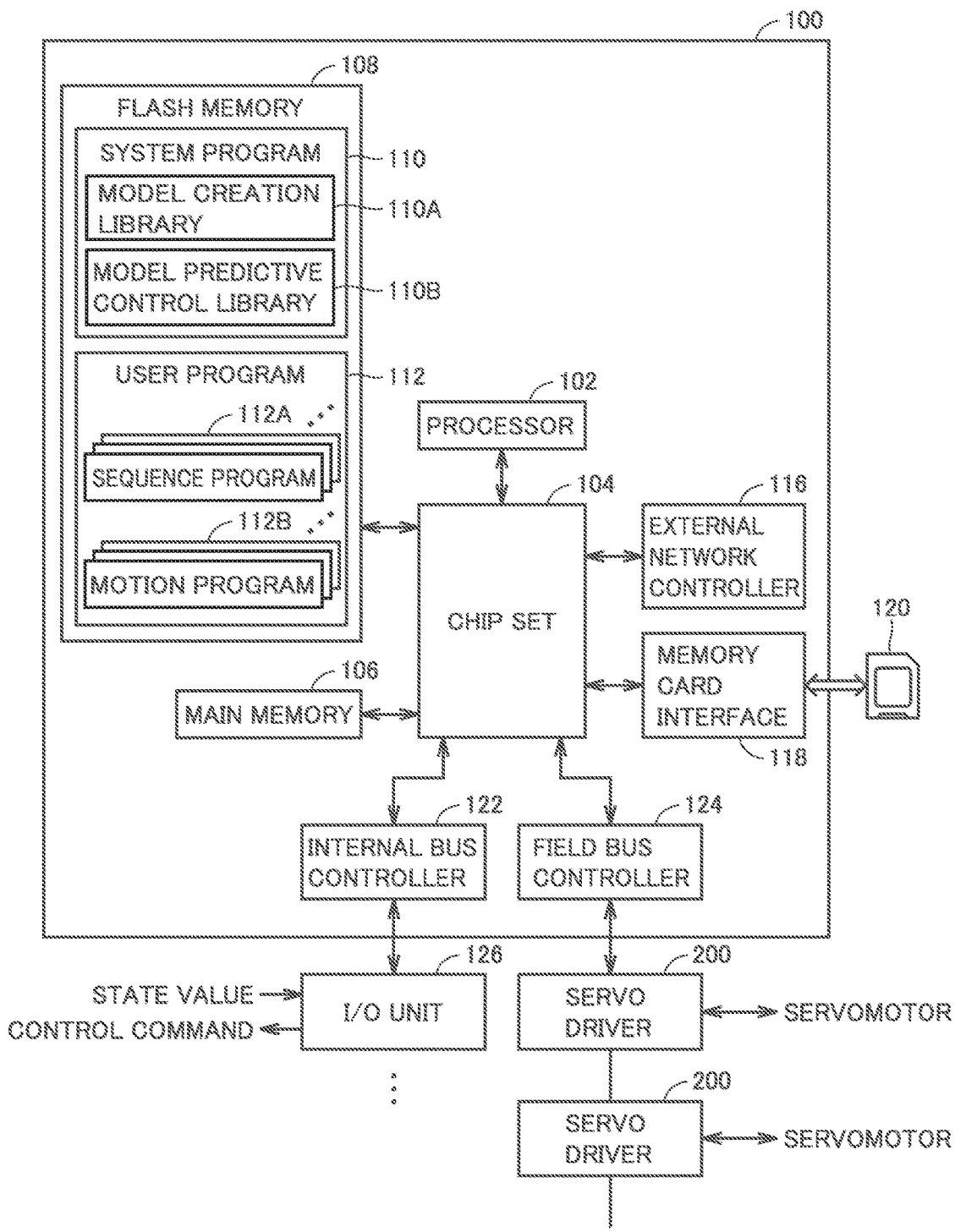
FIG. 2 is a schematic diagram showing an example of a hardware configuration of a control device 100 according to the present embodiment.

FIG. 2 is a schematic diagram showing an example of a hardware configuration of control device 100 according to the present embodiment. As shown in FIG. 2, control device 100 includes a processor 102 such as a CPU (Central Processing Unit) or an MPU (Micro-Processing Unit), a chip set 104, a main memory 106, a flash memory 108, an external network controller 116, a memory card interface 118, an internal bus controller 122, a field bus controller 124, an external network controller 116, and a memory card interface 118.

Processor 102 reads a system program 110 and a user program 112 stored in flash memory 108, and develops them in main memory 106 and executes them to implement any control for the controlled object. Processor 102 executes system program 110 and user program 112 to perform processing involved in outputting a manipulated variable output to servo driver 200, communicating data via the field bus, and the like, as will be described hereinafter.

System program 110 includes instruction codes for providing basic functions of control device 100, such as data input/output processing and execution timing control. System program 110 includes, as a part thereof, a model creation library 110A and a model predictive control library 110B. These libraries are a type of program module and include instruction codes for implementing processings and functions according to the present embodiment. User program 112 is designed depending on the controlled object, as desired, and includes a sequence program 112A for executing sequence control and a motion program 112B for executing motion control. Processings and functions according to the present embodiment are implemented by defining in user program 112 a model creation function block and a model predictive control function block using model creation library 110A and model predictive control library 110B, respectively. A function block is a component of a program executed by control device 100, and means a modularization of a program element which is used a plurality of times.

Chip set 104 controls components to implement processing as control device 100 as a whole.

Internal bus controller 122 is an interface configured to communicate data with various devices coupled to control device 100 via an internal bus. An I/O unit 126 is connected as an example of such a device.

Field bus controller 124 is an interface configured to communicate data with various devices coupled to control device 100 via a field bus. As an example of such a device, servo driver 200 is connected.

Internal bus controller 122 and field bus controller 124 can issue any instruction to a device connected thereto and can obtain any data (including measured values) managed by the device. Internal bus controller 122 and/or field bus controller 124 also function as an interface configured to communicate data with servo driver 200.

External network controller 116 controls communicating data through various wired/wireless networks. Memory card interface 118 is configured to allow memory card 120 to be attached thereto and detached therefrom, and can write data to memory card 120 and read data from memory card 120.

<B. Servo Driver>

Operation of servo driver 200 connected to control device 100 according to the present embodiment will now be described. Servo driver 200 receives a manipulated variable output from control device 100 as a command value (a command position or a command speed), and receives a signal output from an encoder coupled to servomotor 300 as a feedback value. Servo driver 200 uses the command value and the feedback value to perform a control operation in accordance with a control loop of a model tracking control system, for example.

When servo driver 200 receives a command position as the command value, servo driver 200 performs a control operation in accordance with a position control loop and a speed control loop. When servo driver 200 receives a command speed as the command value, servo driver 200 performs a control operation in accordance with the speed control loop.

Servo driver 200 performs the control operation in accordance with the position control loop to calculate a command speed corresponding to a positional deviation between a measured position of servomotor 300 obtained from a feedback value and the command position provided from control device 100.

Servo driver 200 performs the control operation in accordance with the speed control loop to calculate a torque corresponding to a speed deviation between the command speed and a measured speed of servomotor 300 obtained from a feedback value. Servo driver 200 outputs an operation signal indicating a command for a current to cause servomotor 300 to generate the calculated torque.

<C. Exemplary Functional Configuration of Control Device>

Figure 3:
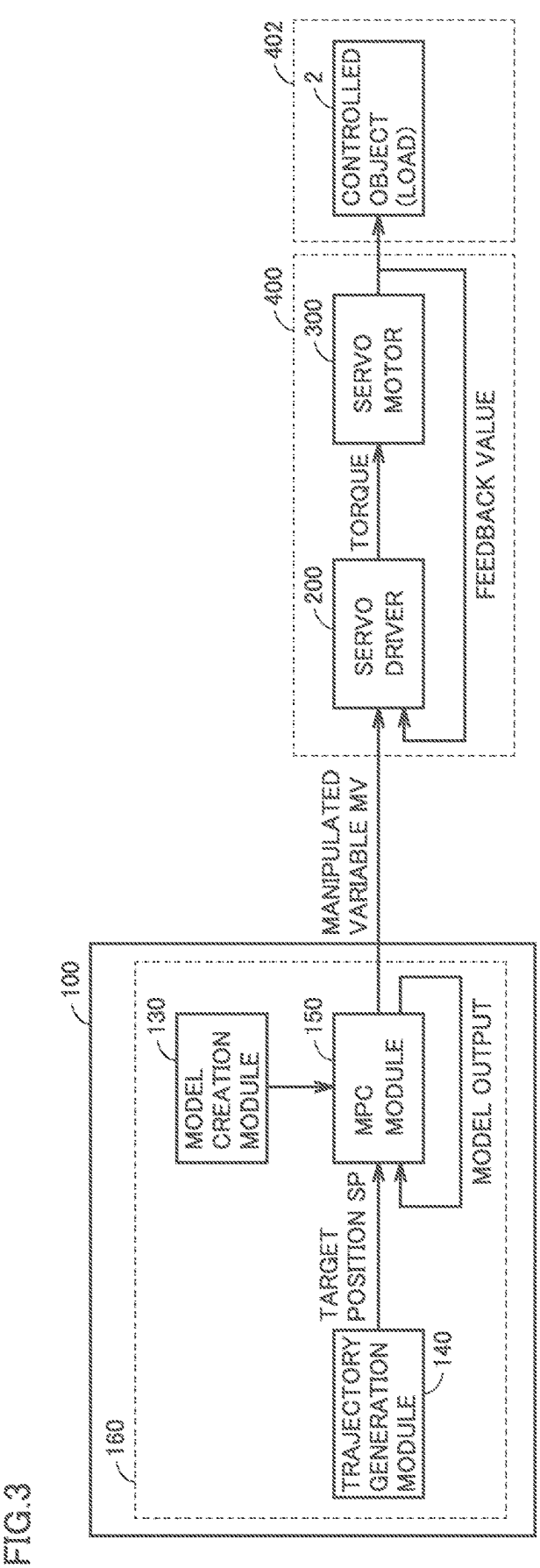
FIG. 3 is a schematic diagram showing a functional configuration of the control device according to the present embodiment.

FIG. 3 is a schematic diagram showing a functional configuration of the control device according to the present embodiment. As shown in FIG. 3, control device 100 includes a control unit 160 including a model creation module 130, a trajectory generation module 140, and a model predictive control module 150. In the figure, model predictive control is also referred to as "MPC". Control device 100 includes two control units 160 corresponding to servo drivers 200X and 200Y, respectively. However, only one of the two control units 160 is illustrated in FIG. 3 for simplicity.

Model creation module 130 is typically implemented as the model creation function block is defined in user program 112 and thereby model creation library 110A is called. That is, model creation module 130 is functionalized by a function block defined in user program 112.

Model creation module 130 creates a first dynamics model representing dynamics of a first target to be modelled 400 composed of servo driver 200 and servomotor 300. Model creation module 130 provides model predictive control module 150 with a characteristic parameter which defines the created first dynamics model.

Trajectory generation module 140 generates time-series data of target positions for controlled object 2 along a previously specified target trajectory, and sequentially reads each target position SP corresponding to a control period from the time-series data and inputs it to model predictive control module 150. Specifically, trajectory generation module 140 extracts from the time-series data of the target positions a plurality of target positions for a period of time from the current time to the end of a prediction horizon serving as a fixed period of time in the future, and inputs the plurality of extracted target positions to model predictive control module 150.

Control device 100 may previously store the time-series data of the target positions that define the target trajectory. In that case, trajectory generation module 140 accesses the previously stored time-series data of the target positions. Thus, each target position for a control period that defines the target trajectory may be stored previously in the form of time-series data, or each target position for a control period may be sequentially calculated according to a predetermined calculation formula.

Model predictive control module 150 is typically implemented as the model predictive control function block is defined in user program 112 and thereby model predictive control library 110B is called. That is, model predictive control module 150 is functionalized by a function block defined in user program 112.

Model predictive control module 150 creates a second dynamics model representing dynamics of a second target to be modelled 402 composed of controlled object 2 serving as a load. Model predictive control module 150 uses the first and second dynamics models to perform model predictive control for each control period to generate a manipulated variable MV to be output to servo driver 200. Model predictive control module 150 outputs the generated manipulated variable MV as a command value to servo driver 200.

<D. Creating the First Dynamics Model>

A method for creating the first dynamics model will now be described. The first dynamics model is created using a method disclosed in Japanese Patent Laid-Open No. 2018-120327 (PTL 2), for example. The first dynamics model is created by tuning before model predictive control is performed.

Figure 4:
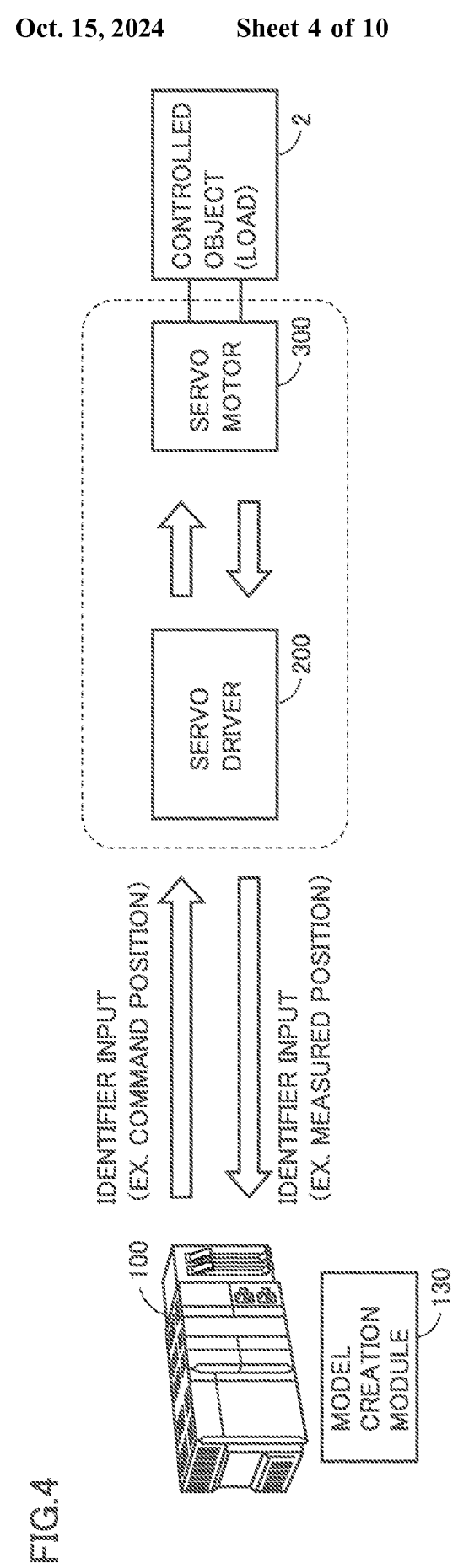
FIG. 4 is a diagram for illustrating tuning performed to create a first dynamics model.

FIG. 4 is a diagram for illustrating tuning performed to create the first dynamics model. As shown in FIG. 4, model creation module 130 of control device 100 sequentially outputs to servo driver 200 a plurality of manipulated variables (e.g., command positions) that are preset for tuning, and obtains measured positions of servomotor 300. A measured position of servomotor 300 is determined from a feedback value output from an encoder coupled to the rotation shaft of servomotor 300. Model creation module 130 can set a manipulated variable and a measured position as an identifier input and an identifier output, respectively, and use a relationship of the identifier output with respect to the identifier input to apply system identification to generate the first dynamics model.

The first dynamics model is represented by a function, which is represented, for example, by the following function $P_{CM}(z^{-1})$. Function $P_{CM}(z^{-1})$ is a discrete time transfer function obtained by combining a dead time element and an n-order delay element. In the first dynamics model represented by function $P_{CM}(z^{-1})$, a dead time d for the dead time element and variables $a_1$-$a_n$ and $b_1$-$b_m$ for the n-order delay element are determined as characteristic parameters. Note that optimal values may also be determined for the order n and the order m.

$$P_{CM}(z^{-1}) = z^{-d} \frac{b_1 z^{-1} + b_2 z^{-2} + \ldots + b_m z^{-m}}{1 + a_1 z^{-1} + a_2 z^{-2} + \ldots + a_n z^{-n}} \quad \text{[Expression 1]}$$

A process of creating such characteristic parameters (that is, system identification) may be performed through least squares or the like using an identifier input and an identifier output.

Specifically, the characteristic parameters have their values determined such that an output y obtained when a manipulated variable selected as an identifier input is given to a variable u of $y=P_{CM}(z^{-1})*u$ matches a measured position selected as an identifier output (that is, such that a minimal error is provided).

In doing so, dead time d may be determined in advance and an identifier output is advanced by the determined dead time d to generate a compensated time waveform, and the remaining element of the transfer function other than the dead time element may be determined based on the compensated time waveform.

A plurality of first dynamics models may be calculated by varying the order n and the order m. In that case, an optimal first dynamics model is created based on one or more evaluation criteria. The evaluation criteria include a degree indicative of reliability of identification (a FIT rate), validity of dead time, and the like. For a static system model, a steady-state gain's validity may be applied as an evaluation criterion.

A FIT rate is a value indicating a rate of matching between an output calculated when an identifier input is given to function $P_{CM}(z^{-1})$ defined by a calculated characteristic parameter and an actually collected identifier output. For such a FIT rate, a known calculation formula used to calculate an error can be used. Basically, a calculation formula with a maximal FIT rate (that is, with a maximal matching rate/a minimal error) may be selected.

In evaluating the first dynamics model, a model exhibiting a peculiar behavior may be excluded. For example, when a dynamics model exhibits a peculiar behavior that is not included in an inherent characteristic of the controlled object, it is not considered to present the inherent characteristic of the controlled object, and accordingly, it may be excluded as a problematic dynamics model.

Thus, in the process for calculating the first dynamics model, a plurality of first dynamics models with characteristic parameters varied may be calculated. In that case, the FIT rate described above may be used to create one of the plurality of first dynamics models.

<E. Creating the Second Dynamics Model>

A method for creating the second dynamics model will now be described. The second dynamics model is created using a vibration waveform of controlled object 2 that is obtained in the tuning performed before model predictive control is performed. For example, in the tuning performed to create the first dynamics model, laser displacement meters 5 and 8 shown in FIG. 1 measure a vibration waveform of working plate 3 immediately after servomotor 300 is stopped from rotating.

Figure 5:
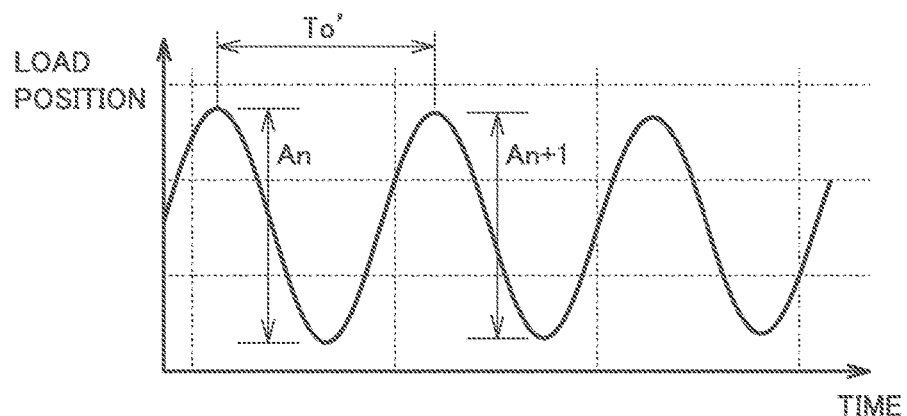
FIG. 5 is a diagram showing an example of a vibration waveform.

FIG. 5 is a diagram showing an example of the vibration waveform. FIG. 5 shows a graph in which the horizontal axis represents time and the vertical axis represents the position of controlled object 2 (i.e., the load position). Even when servomotor 300 is stopped from rotating, controlled object 2 including working plate 3 vibrates. Working plate 3 vibrates in accordance with a vibration frequency depending on controlled object 2. Accordingly, model creation module 130 of control device 100 extracts a vibration period $T_0'$ from the vibration waveform, and calculates a vibration frequency $f_0$ from $f_0=1/T_0'$. Alternatively, model creation module 130 may consider influence of damping and follow an expression 2 indicated below to calculate vibration frequency $f_0$. $\zeta$ represents a vibration damping ratio.

$$f_0 = 1 \Big/ \left( \sqrt{1-\zeta^2}\, T_0' \right) \quad \text{[Expression 2]}$$

Model predictive control module 150 uses the calculated vibration frequency $f_0$ to create the second dynamics model. The second dynamics model is represented by a function $P_{ML}(s)$, for example as indicated below by the following expression 3. In function $P_{ML}(s)$, $\omega_0$ is the angular frequency of vibration of controlled object 2, and it is indicated by $\omega_0=2\pi f_0$. Model predictive control module 150 can use the calculated vibration frequency $f_0$ to create the second dynamics model represented by function $P_{ML}(s)$.

$$P_{ML}(s) = \frac{\omega_0^2}{s^2 + \omega_0^2} \quad \text{[Expression 3]}$$

The second dynamics model may be represented by a function $P_{ML}(s)$ as indicated below by the following expression 4 or 5.

$$P_{ML}(s) = \frac{\omega_0^2}{s^2 + 2\zeta\omega_0 s + \omega_0^2} \quad \text{[Expression 4]}$$

-continued $$P_{ML}(s) = \frac{2\zeta\omega_0 s + \omega_0^2}{s^2 + 2\zeta\omega_0 s + \omega_0^2} \quad \text{[Expression 5]}$$

ξ is expressed as $\xi=\delta/(\delta^2+4\pi^2)^{1/2}$ using logarithmic decrement δ. Logarithmic decrement δ is expressed by δ=ln(1/Adr) using an amplitude ratio Adr of two successive waves in a vibration waveform and natural logarithm ln. Amplitude ratio Adr is represented by a ratio of amplitudes $A_n$ and $A_{n+1}$ of two successive waves in the vibration waveform shown in FIG. 5, i.e., $A_{n+1}/A_n$. Accordingly, model creation module 130 can extract amplitude ratio Adr and vibration frequency $f_0$ from the vibration waveform and use the extracted amplitude ratio Adr and vibration frequency $f_0$ to create the second dynamics model represented by function $P_{ML}(s)$ of expression 4 or 5.

Model predictive control module 150 transforms function $P_{ML}(s)$ of expressions 3 to 5 into a discrete time format (or performs Z transform) and uses the transformed function $P_{ML}(z^{-1})$ to perform calculation. That is, model predictive control module 150 inputs an input value to a variable u' of $y'=P_{ML}(z^{-1})*u'$ to calculate an output value y'.

<F. Example of Processing Through Model Predictive Control>

Figure 6:
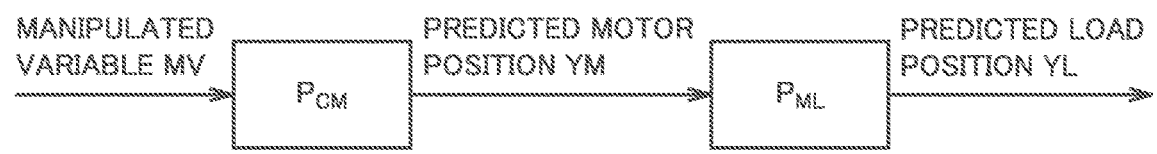
FIG. 6 is a diagram showing an example of a method for calculating a load position by using the first dynamics model and a second dynamics model.

Before describing an example of processing through model predictive control, reference will be made to FIG. 6 to describe an example of a method for calculating a load position through a first dynamics model $P_{CM}$ and a second dynamics model $P_{ML}$. FIG. 6 is a diagram showing the example of the method for calculating the load position through first and second dynamics models $P_{CM}$ and $P_{ML}$.

As shown in FIG. 6, model predictive control module 150 can input manipulated variable MV to first dynamics model $P_{CM}$ to calculate a predicted position of servomotor 300 corresponding to manipulated variable MV (hereinafter referred to as a "predicted motor position YM"). Model predictive control module 150 can input the calculated predicted motor position to second dynamics model $P_{ML}$ to calculate a load position corresponding to the predicted motor position (hereinafter referred to as a "predicted load position YL").

Using the calculation method shown in FIG. 6, model predictive control module 150 generates manipulated variable MV to be output to servo driver 200 for each control period for example through the following control:

Model predictive control module 150 inputs manipulated variables $MV_k, \ldots, MV_{k-m+1}$ generated up to the current control period k to first dynamics model $P_{CM}$ represented by function $P_{CM}(z^{-1})$ of expression 1 to calculate a predicted motor position $YM_{k+d+1}$ for a control period k+d+1. Herein, m represents an order defined by first dynamics model $P_{CM}$, as described above. Control period k+d+1 is a control period after dead time d+1 defined in the dynamics model elapses since the current control period k ends.

Model predictive control module 150 inputs predicted motor position $YM_{k+d+1}$ to second dynamics model $P_{ML}$ to calculate a predicted load position $YL_{k+d+1}$ for control period k+d+1.

Predicted load position $YL_{k+d+1}$ thus obtained is used to generate manipulated variable MV for a subsequent control period. In doing so, the calculated data is shifted by one control period in preparation for the subsequent control period. For example, predicted load position $YL_{k+d+1}$ thus obtained is used as a predicted load position $YL_{k+d}$ in the subsequent control period. In other words, in the current control period k, predicted load position $YL_{k+d+1}$ calculated in the previous control period is used as predicted load position $YL_{k+d}$. Model predictive control module 150 performs model predictive control using predicted load position $YL_{k+d}$ calculated in the previous control period and first and second dynamics models $P_{CM}$ and $P_{ML}$ to generate manipulated variable $MV_k$ to be output to servo driver 200.

A known technique may be employed for model predictive control. For example, model predictive control module 150 may generate manipulated variable $MV_k$ in accordance with the following model predictive control.

After model predictive control module 150 creates first and second dynamics models $P_{CM}$ and $P_{ML}$, model predictive control module 150 performs step response calculation and ramp response calculation.

Step response calculation is calculation to obtain an output Ys of a dynamics model (a model obtained by combining first and second dynamics models $P_{CM}$ and $P_{ML}$ together) when a maximum input (a step input) is continued in an initial state with an output of 0. In the following description, output Ys at a time i (>dead time d) elapsing since inputting the step input is started is indicated as Ys(i).

Ramp response calculation is a calculation to obtain an output Yr of the dynamics model when an input increased by one step for each control period (i.e., a ramp input) is provided in an initial state having an output of 0. In the following description, output Yr at time i (>dead time d) elapsing since inputting the ramp input is started is indicated as Yr(i).

Further, model predictive control module 150 performs free response calculation with predicted load position $YL_{k+d}$ set in a designated state. Free response calculation is a calculation to obtain an output Yf(k+d+H) of a dynamics model in a designated state in control period k+d for a control period k+d+H later than control period k+d when an input for the current control period k et. seq. is 0.

With a step output having a magnitude ks and a ramp output having a magnitude kr, model predictive control module 150 calculates an output $MH_{k+d+H}$ of the dynamics model for control period k+d+H after control period k+d in accordance with the following expression:

$$MH_{k+d+H}=ks*Ys(H)+kr*Yr(H)+Yf(k+d+H).$$

Model predictive control module 150 obtains ks and kr so that a difference ΔMH between $MH_{k+d+H}$ and predicted load position $YL_{k+d}$ matches a difference ΔPH between a position $RH_{k+d+H}$ on a reference trajectory for control period k+d+H and predicted load position $YL_{k+d}$. The reference trajectory is specified by a target position $SP_{k+d+H}$ for control period k+d+H and a predetermined reference trajectory time constant Tr. In order to obtain two variables ks and kr, two values are set as H. The two values set as H are periods of time shorter than the vibration period of controlled object 2, and they are for example ⅛ and ¼ of the vibration period. And variables ks and kr are calculated by solving simultaneous equations composed of the equations for the two values.

Model predictive control module 150 may generate a product of ks obtained as described above and the step input as manipulated variable $MV_k$ to be output to servo driver 200 in the current control period k.

<G. Processing Procedure>

Figure 7:
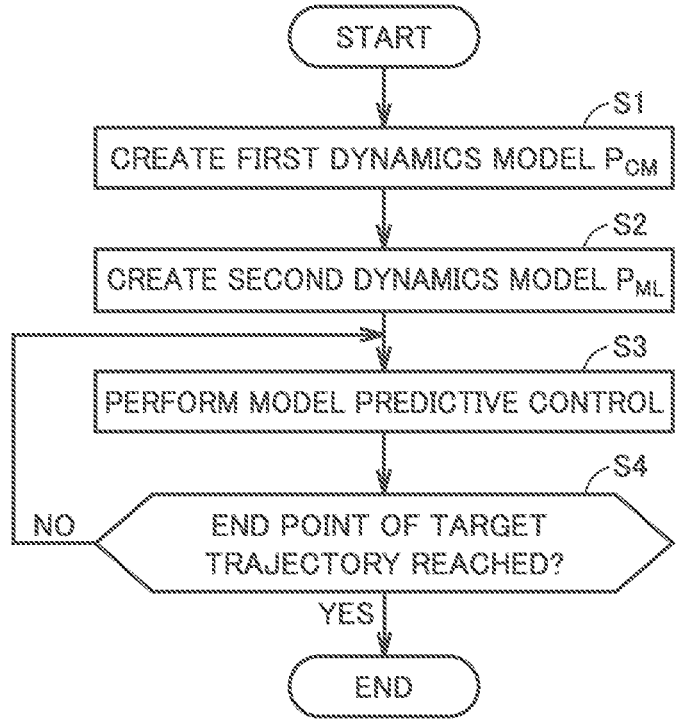
FIG. 7 is a flowchart of a procedure of a process for controlling a motor by a control system according to the present embodiment.

A processing procedure for motor control by control device 100 according to the present embodiment will now be outlined. FIG. 7 is a flowchart showing a processing procedure for motor control by a control system according to the present embodiment. FIG. 7 indicates steps, which may be implemented by the control device 100 processor 102 executing a control program (including system program 110 and user program 112 shown in FIG. 2).

Initially, control device 100 causes servo driver 200 to perform tuning and thereby obtains an identifier input and an identifier output, and creates first dynamics model $P_{CM}$ based on the obtained identifier input and output (step S1).

Subsequently, control device 100 creates second dynamics model $P_{ML}$ using a vibration waveform of controlled object 2 obtained in the tuning (step S2).

Control device 100 performs model predictive control using first and second dynamics models $P_{CM}$ and $P_{ML}$ respectively created in steps S1 and S2 to generate manipulated variable MV to be output to servo driver 200 for each control period (Step S3).

Subsequently, control device 100 determines whether the end point of the target trajectory is reached (step S4). When the end point of the target trajectory is not reached (NO in step S4), step S3 is repeated.

When the end point of the target trajectory is reached (YES in step S4), model predictive control ends. Through a processing procedure as above, control device 100 implements control according to the present embodiment. Note that steps S1 to S4 are performed for each designated servo driver 200. Accordingly, steps S1 to S4 may be performed for each of the plurality of servo drivers 200 in parallel.

Figure 8:
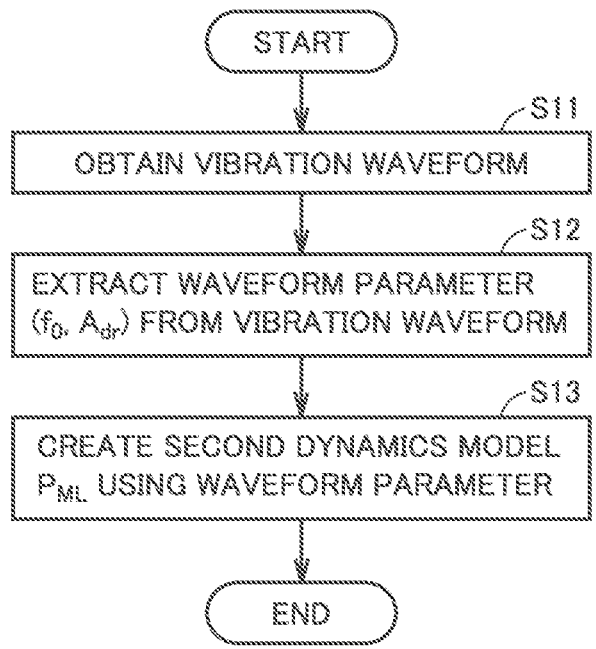
FIG. 8 is a flowchart of a subroutine of step S2 shown in FIG. 7.

FIG. 8 is a flowchart of a subroutine of step S2 shown in FIG. 7. That is, FIG. 8 shows a flow of a processing procedure of a model creating method for creating the second dynamics model. The model creating method for creating the second dynamics model includes a step S11 of obtaining a vibration waveform of controlled object 2, a step S12 of extracting a waveform parameter from the vibration waveform, and a step S13 of creating the second dynamics model using the waveform parameter.

<Exemplary Programming>

The motor control by control device 100 according to the present embodiment can be performed by describing instructions in user program 112 executed by control device 100. An example of programming of control device 100 according to the present embodiment will now be described below.

Figure 9:
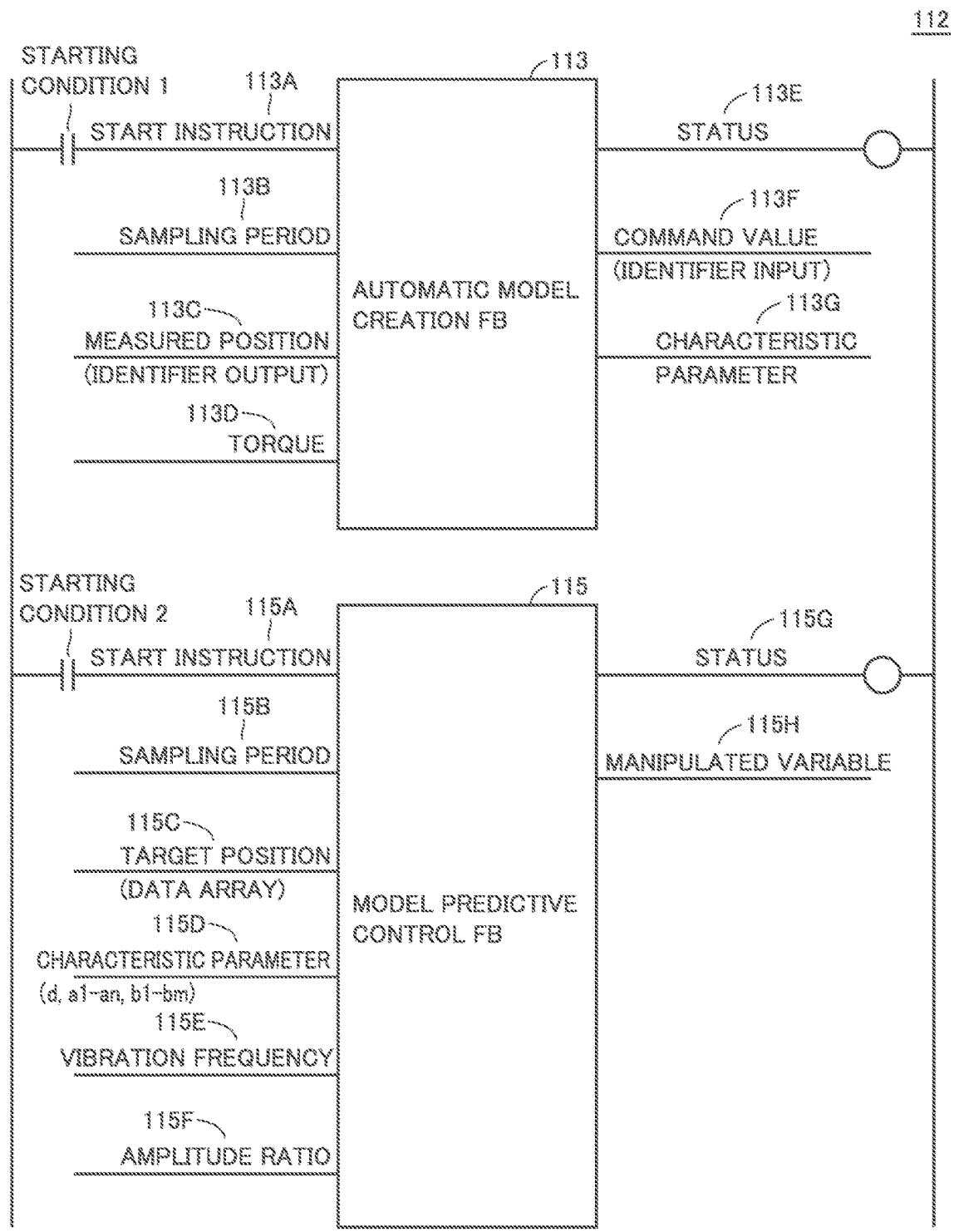
FIG. 9 is a diagram showing an example of an instruction code of a user program executed by the control device according to the present embodiment.

FIG. 9 is a diagram showing an example of an instruction code of a user program executed in control device 100 according to the present embodiment. User program 112 shown in FIG. 9 includes two function blocks (hereinafter also referred to as "FB"). A first function block is an automatic model creation FB 113 configured to define execution of creation of the first dynamics model. Model creation module 130 described above is implemented by automatic model creation FB 113. A second function block is a model predictive control FB 115 configured to define creation of the second dynamics model and execution of model predictive control. Model predictive control module 150 described above is implemented by model predictive control FB 115.

While automatic model creation FB 113 and model predictive control FB 115 are described side by side for convenience of description, they may be used individually.

Automatic model creation FB 113 includes, as input items, a start instruction 113A, a sampling period 113B, an identifier output 113C, and torque 113D. Automatic model creation FB 113 includes, as output items, a status 113E, an identifier input 113F, and a characteristic parameter 113G.

For example, a condition for starting creation of the first dynamics model is set for start instruction 113A. In the example shown in FIG. 9, a contact point corresponding to a starting condition 1 is associated. For sampling period 113B, a period in which the identifier input and the identifier output are collected is set.

A signal used as the identifier output is set for identifier output 113C. In the example shown in FIG. 9, a measured position of servomotor 300 is set as the identifier output. When user program 112 is described in variable programming, a variable name indicating a signal to be used as the identifier output is set.

A signal indicating a torque serving as a feedback value for generating a magnitude for the identifier output is set for torque 113D. The signal output from torque 113D is used to determine a magnitude for the identifier input such that the identifier output can have a sufficient magnitude within a range in which torque saturation does not occur.

Status 113E outputs a value indicating a state of execution of a process performed by automatic model creation FB 113.

A signal used as the identifier input is set for identifier input 113F. In the example shown in FIG. 9, a manipulated variable (that is, a command value) to be output to servo driver 200 is set as the identifier input. When user program 112 is described in variable programming, a variable name indicating a signal to be used as the identifier input is set.

From characteristic parameter 113G, characteristic parameters (d, $a_1$-$a_n$, and $b_1$-$b_m$) which define the first dynamics model are output. When user program 112 is described in variable programming, a variable name indicating a structure for storing these characteristic parameters may be set. These characteristic parameters may be used in model predictive control FB 115.

Model predictive control FB 115 includes, as input items, a start instruction 115A, a sampling period 115B, a target position 115C, a characteristic parameter 115D, a vibration frequency 115E, and an amplitude ratio 115F. Model predictive control FB 115 includes a status 115G and a manipulated variable 115H as output items.

For example, a condition for starting model predictive control is set for start instruction 115A. In the example shown in FIG. 9, a contact point corresponding to a starting condition 2 is associated.

A control period for performing calculation by model predictive control is set for sampling period 115B.

A data array of a plurality of target positions which defines a predetermined target trajectory for controlled object 2 is set for target position 115C.

Characteristic parameter 115D receives characteristic parameters (d, $a_1$-$a_n$ and $b_1$-$b_m$) output from characteristic parameter 113G of automatic model creation FB 113.

Vibration frequency $f_0$ extracted from a previously measured vibration waveform of controlled object 2 is input to vibration frequency 115E. Amplitude ratio Adr extracted from the vibration waveform is input to amplitude ratio 115F.

A value indicating a state of execution of a process by model predictive control FB 115 is output from status 115G.

Manipulated variable 115H outputs manipulated variable MV generated by performing model predictive control using the first and second dynamics models. The first dynamics model is defined by a characteristic parameter input to characteristic parameter 115D. Of vibration frequency $f_0$ input to vibration frequency 115E and amplitude ratio Adr input to amplitude ratio 115F, at least vibration frequency $f_0$ defines the second dynamics model. Servo driver 200 will receive manipulated variable MV output from manipulated variable 115H. Such model predictive control allows controlled object 2 to assume a position having a trajectory closer to the target trajectory.

Thus, control device 100 according to the present embodiment allows first and second dynamics models to be created and used to implement model predictive control simply by describing a user program using two function blocks.

<I. Simulation Result>

A simulation was performed to verify an effect of control device 100 according to the present embodiment.

Figure 10:
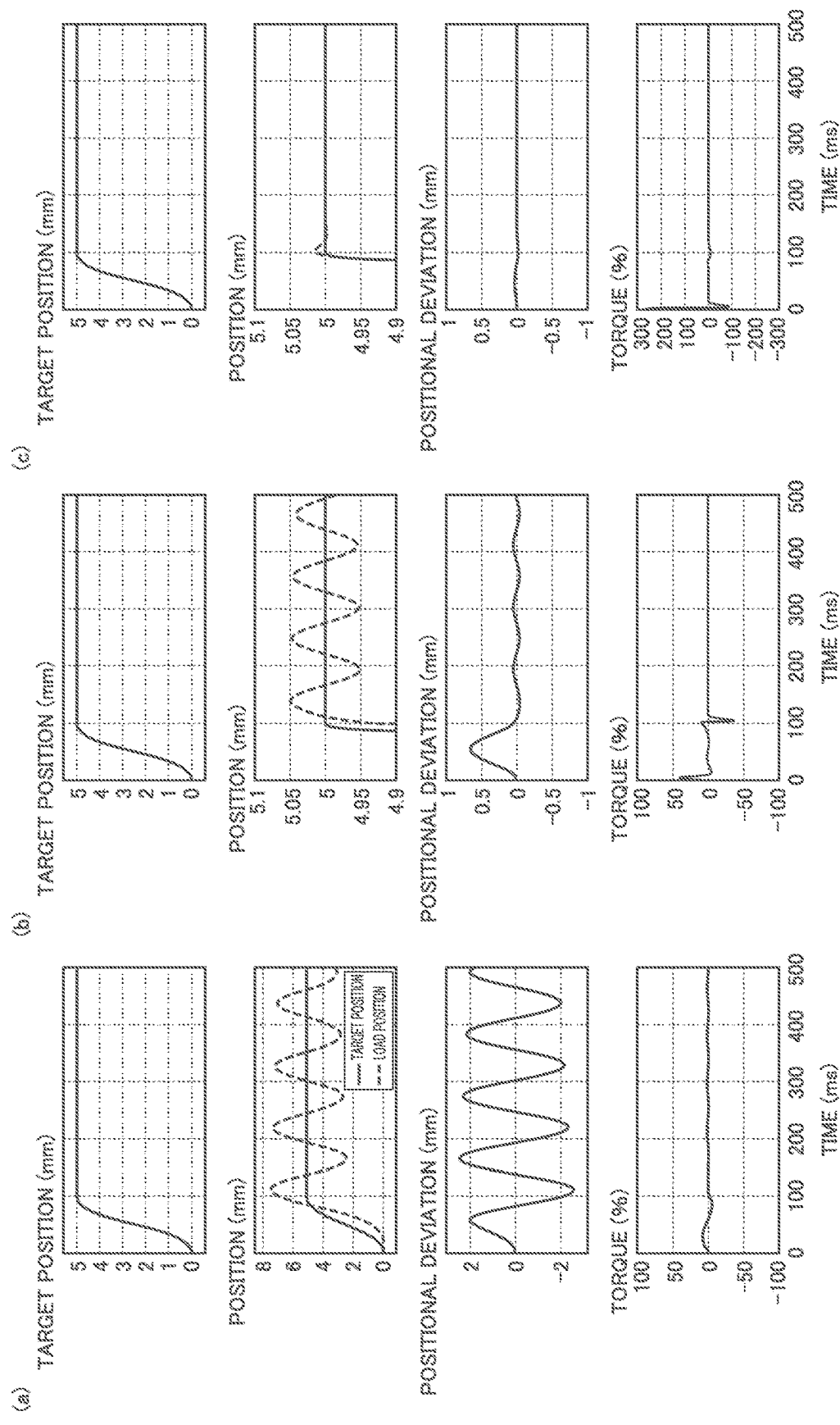
FIG. 10 is a diagram showing an example of a simulation result of motor control.
Figure 11:
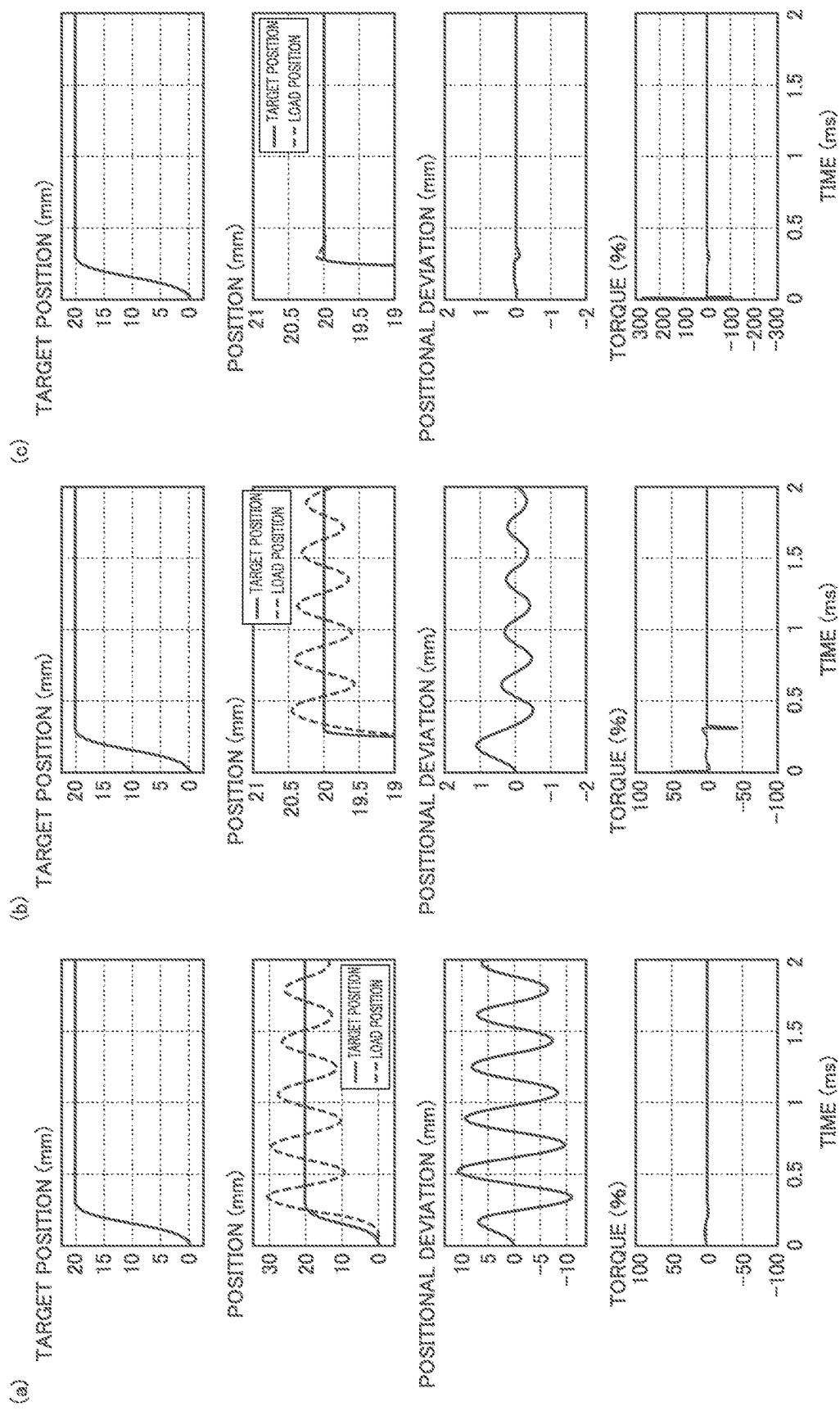
FIG. 11 is a diagram showing another example of a simulation result of the motor control.

FIG. 10 is a diagram showing an example of a simulation result of the motor control. FIG. 11 is a diagram showing another example of a simulation result of the motor control. FIG. 10 shows a result of a simulation in which a controlled object serving as a load has a vibration frequency of 9.2 Hz and is moved by 5 mm in 100 ms. FIG. 11 shows a result of a simulation in which the controlled object serving as a load has a vibration frequency of 2.75 Hz and is moved by 20 mm in 300 ms.

In FIGS. 10 and 11, a left column (a) shows a simulation result obtained when a command value generated from a target trajectory is output to a servo driver. A middle column (b) shows a simulation result obtained when a command value is compensated for using the inverse characteristic filter disclosed in PTL 1 and the compensated command value is output to the servo driver. A right column (c) shows a simulation result obtained when manipulated variable MV generated through model predictive control according to the present embodiment is output to the servo driver. Note that columns (a) to (c) are provided in a servo driver position control system that is a two-degree-of-freedom model matching control system with identical control parameters used.

In FIGS. 10 and 11, columns (a) to (c) each have a first row representing how a target position changes with time, that is, a target trajectory. The target trajectory is a fifth-order trajectory. The columns each have a second row representing how the target position and controlled object 2's position (the load position) change with time. The columns each have a third row representing how a deviation between the target position and the load position changes with time. The columns each have a fourth row representing how torque provided to the servomotor changes with time. The graphs in the first to third rows each have a horizontal axis with the same scale as that of the horizontal axis of each graph in the fourth row.

As shown in FIGS. 10 and 11, when the simulation result obtained when the inverse characteristic filter is used is compared with the simulation result obtained when the command value generated from the target trajectory is output to the servo driver without compensation, the former presents vibration with an amplitude of several tenths of that of the latter, although the former presents larger torque immediately after the control is started. When the simulation result using model predictive control according to the present embodiment is compared with the simulation result using the inverse characteristic filter, the former presents vibration with a further smaller amplitude, although the former presents further larger torque immediately after the control is started. Thus, it has been confirmed that control device 100 of the present embodiment has a higher vibration damping effect.

Further, as can be seen from the graphs in the third row, when using model predictive control according to the present embodiment is compared with using the inverse characteristic filter disclosed in PTL 1, the former provides a reduced deviation between the target position and the load position. From this, enhanced target trajectory tracking has been confirmed.

<J. Advantage>

Thus, control device 100 of the present embodiment is connected to servo driver 200 configured to drive servomotor 300 configured to move controlled object 2, and is configured to output a manipulated variable to servo driver 200 to control the position of controlled object 2. Control device 100 includes control means 160 configured to perform model predictive control using a dynamics model representing a relationship between the manipulated variable and the position of controlled object 2 to generate the manipulated variable to be output to servo driver 200. The dynamics model includes a first dynamics model representing a relationship between the manipulated variable and the position of servomotor 300 (the motor position), and a second dynamics model representing a relationship between the position of the servomotor and the position of controlled object 2 (the load position). The second dynamics model is created using a waveform parameter extracted from a vibration waveform of controlled object 2. The waveform parameter includes a vibration frequency.

The vibration waveform of controlled object 2 can be measured using a simple measuring instrument (e.g., laser displacement meter 5, 8). A simple measuring instrument can be used to measure the vibration waveform of controlled object 2 to create the second dynamics model representing the relationship between the motor position and the load position. The first dynamics model and the second dynamics model can be combined together to create a dynamics model representing a relationship between the manipulated variable and the load position. The created dynamics model can be used to perform model predictive control to generate a manipulated variable, and the load position can be caused to track a target trajectory and vibration damping for the load position can be improved.

Preferably, the waveform parameter further includes an amplitude ratio of two successive waves in the vibration waveform. Thus, the second dynamics model expressed by function $P_{ML}(s)$ of an expression 4 or 5 can be created. As a result, a predicted load position is predicted with better accuracy.

Model predictive control module 150 of control unit 160 inputs manipulated variable MV generated up to the current control period k to the first dynamics model to calculate predicted motor position $YM_{k+d+1}$ for future control period k+d+1 elapsing since control period k ends by dead time d+1. Further, model predictive control module 150 inputs predicted motor position $YM_{k+d+1}$ to the second dynamics model to calculate predicted load position $YL_{k+d+1}$ for control period k+d+1. Model predictive control module 150 uses predicted load position $YL_{k+d+1}$ and a dynamics model (the first and second dynamics models) to generate manipulated variable MV to be output to servo driver 200 in a subsequent control period so as to minimize a deviation from the target trajectory of the load position assumed in control period k+d+1 et. seq. This allows the load position to track the target position.

Control unit 160 includes: model creation module 130 configured to output a characteristic parameter which defines the first dynamics model; and model predictive control module 150 configured to receive the characteristic parameter and the waveform parameter and generate manipulated variable MV to be output to servo driver 200. Furthermore, control device 100 includes processor 102 configured to execute user program 112. Model creation module 130 and model predictive control module 150 are implemented by a function block defined in user program 112. Thus, model creation module 130 and model predictive control module 150 can be easily implemented by using the function block.

<K. Modified Examples>
<K-1. Modified Example 1>

In order to predict predicted load position YL more accurately, the model predictive control module may receive a feedback value from servomotor 300 and use it to compensate for predicted motor position YM.

Figure 12:
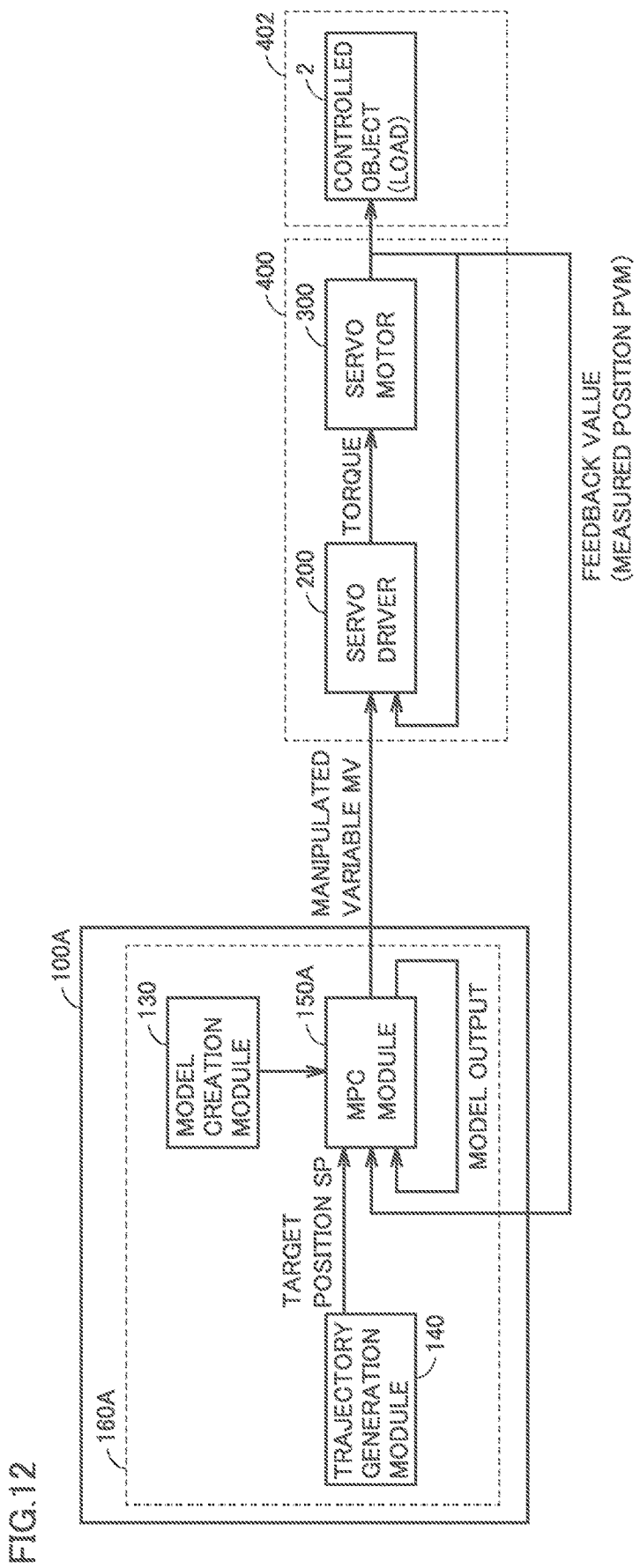
FIG. 12 is a schematic diagram showing a functional configuration of the control device according to a modified example.

FIG. 12 is a schematic diagram showing a functional configuration of a control device according to a modified example. As shown in FIG. 12, a control device 100A according to the modified example differs from control device 100 shown in FIG. 3 in that control unit 160 is replaced with a control unit 160A. Control unit 160A differs from control unit 160 in that control unit 160A includes a model predictive control module 150A instead of model predictive control module 150.

As well as model predictive control module 150, model predictive control module 150A uses a first dynamics model to calculate predicted motor position YM and uses a second dynamics model to calculate predicted load position YL. Note, however, that model predictive control module 150A differs from model predictive control module 150 in that the former uses a measured position PVM of servomotor 300 to compensate for predicted motor position YM. Measured position PVM of servomotor 300 is determined from a feedback value received from servomotor 300.

Hereinafter, a specific example of a method for compensating for predicted motor position YM will be described. The following specific example is an example when a first dynamics model represented by a function $P_{CM}(z^{-1})$ of an expression 6 is created and a second dynamics model represented by a function $P_{ML}(z^{-1})$ of an expression 7 is created. Function $P_{ML}(z^{-1})$ of expression 7 is obtained, for example, by transforming function $P_{ML}(s)$ of expression 5 into a discrete time format.

$$P_{CM}(z^{-1}) = z^{-d}\frac{b_{CM1}z^{-1}}{1+a_{CM1}z^{-1}}$$ [Expression 6]

$$P_{ML}(z^{-1}) = \frac{b_{ML1}+b_{ML2}z^{-1}}{1+a_{ML1}z^{-1}+a_{ML2}z^{-2}}$$ [Expression 7]

For example, model predictive control module 150A calculates a difference value between predicted motor position YM and a measured motor position $PVM_k$ for the current control period k as a compensated variable C. That is, compensated variable C is expressed by $C=PVM_k-YM_k$. Since dead time d is set in function $P_{CM}(z^{-1})$ of expression 6, predicted motor position $YM_k$ for the current control period k has been calculated in a past control period k−d−1.

Subsequently, model predictive control module 150A compensates for predicted motor position $YM_k$ to measured position $PVM_k$, and uses compensated variable C to compensate for predicted motor positions $YM_{k+1}$ to $YM_{k+d}$ up to control period k+d elapsing since the current control period k by dead time d, as follows:

$$YM_{k+1} \leftarrow YM_{k+1}+C$$

$$\ldots$$

$$YM_{k+d} \leftarrow YM_{k+d}+C$$

Predicted motor positions $YM_{k+1}$ to $YM_{k+d}$ are calculated in past control periods k−d to k−1, respectively.

Subsequently, model predictive control module 150A inputs the compensated predicted motor position $YM_{k+d}$ and manipulated variable $MV_k$ generated in the current control period k to the first dynamics model to calculate predicted motor position $YM_{k+d+1}$ for control period k+d+1. When the first dynamics model is expressed by function $P_{CM}(z^{-1})$ of expression 6, model predictive control module 150A may calculate predicted motor position $YM_{k+d+1}$ for control period k+d+1 in accordance with the following expression:

$$YM_{k+d+1} = -a_{CM1}YM_{k+d}+b_{CM1}MV_k.$$

Thus, model predictive control module 150A compensates for predicted motor position YM. How model predictive control module 150A compensates for predicted motor position YM is not limited to the above-described compensation method, and a different calculation method may be used.

Model predictive control module 150A uses the compensated predicted motor position YM to calculate predicted load position YL. When the second dynamics model is expressed by function $P_{ML}(z^{-1})$ of expression 7, model predictive control module 150A may calculate predicted load position $YL_{k+d+1}$ for control period k+d+1 in accordance with the following expression:

$$YL_{k+d+1} = -a_{ML1}YL_{k+d}-a_{ML2}YL_{k+d-1}+b_{ML1}YM_{k+d+1}+b_{ML2}YM_{k+d}.$$

Model predictive control module 150A may use predicted load position $YL_{k+d+1}$ and a dynamics model (the first and second dynamics models) to generate manipulated variable MV to be output to servo driver 200 in a subsequent control period so as to minimize a deviation from the target trajectory of the load position assumed in control period k+d+1 et. seq.

<K-2. Modified Example 2>

In the above embodiment, the vibration frequency and amplitude ratio of controlled object 2 are extracted from a vibration waveform measured while tuning is performed. However, vibration frequency $f_0$ and amplitude ratio Adr of controlled object 2 may be measured previously through a preliminary experiment or the like and stored in control device 100. In that case, model predictive control module 150 may access previously stored data to read vibration frequency $f_0$ and amplitude ratio Adr.

<K-3. Modified Example 3>

In the above embodiment, automatic model creation FB 113 and model predictive control FB 115 shown in FIG. 9 are used to program control device 100. However, the function blocks are not limited to the example shown in FIG. 9.

For example, automatic model creation FB 113 may include "vibration frequency" and "amplitude ratio" as input items. Vibration frequency $f_0$ is input to the input item "vibration frequency". Amplitude ratio Adr is input to the input item "amplitude ratio". Then, characteristic parameter 113G of automatic model creation FB 113 may output characteristic parameters (d, $a_1$-$a_n$ and $b_1$-$b_m$) which define a dynamics model $P_{CM}*P_{ML}$ obtained by combining first and second dynamics models $P_{CM}$ and $P_{ML}$. In that case, characteristic parameter 115D of model predictive control FB 115 receives characteristic parameters (d, $a_1$-$a_n$ and $b_1$-$b_m$) output from characteristic parameter 113G. Then, manipulated variable 115H of model predictive control FB 115 outputs manipulated variable MV generated while considering dynamics model $P_{CM}*P_{ML}$ defined by the characteristic parameters (d, $a_1$-$a_n$ and $b_1$-$b_m$).

That is, model creation module 130 implemented by automatic model creation FB 113 receives a waveform parameter (vibration frequency $f_0$ and amplitude ratio Adr) and outputs a characteristic parameter which defines dynamics model $P_{CM}*P_{ML}$ obtained by combining first and second dynamics models $P_{CM}$ and $P_{ML}$. Model predictive control module 150 implemented by model predictive control FB 115 receives the characteristic parameter and performs model predictive control using the dynamics model defined by the characteristic parameter to generate a manipulated variable to be output to servo driver 200.

Alternatively, automatic model creation FB 113 may include "load position" as an input item and "vibration frequency" and "amplitude ratio" as output items. The input item "load position" receives a measured position of controlled object 2 as measured by laser displacement meters 5 and 8 shown in FIG. 1. The output item "vibration frequency" outputs how the measured position of controlled object 2 varies with time, that is, vibration frequency $f_0$ extracted from the vibration waveform of controlled object 2. The output item "vibration frequency" outputs amplitude ratio Adr extracted from the vibration waveform. Vibration frequency $f_0$ output from the output item "vibration frequency" is input to vibration frequency 115E of model predictive control FB 115. Amplitude ratio Adr output from the output item "amplitude ratio" is input to amplitude ratio 115F of model predictive control FB 115.

That is, model creation module 130 implemented by automatic model creation FB 113 outputs a characteristic parameter which defines a first dynamics model, and also receives a measured position of controlled object 2 and outputs a waveform parameter (i.e., vibration frequency $f_0$ and amplitude ratio Adr). Model predictive control module 150 implemented by model predictive control FB 115 receives the characteristic parameter and the waveform parameter. Model predictive control module 150 performs model predictive control using the first dynamics model defined by the characteristic parameter and the second dynamics model created using the waveform parameter to generate a manipulated variable to be output to servo driver 200.

<K-4. Modified Example 4>

In the above embodiment, controlled object 2 is of a two-inertial system. However, controlled object 2 may be of a three or more inertial system. A three-inertial system is represented by two vibrations. Accordingly, the second dynamics model is represented in a form in which any two of expressions 3 to 5 are connected in series. For example, second dynamics model $P_{ML}$ is created using function $P_{ML}(s)$ of an expression 8 below:

$$P_{ML}(S) = \frac{2\zeta_1\omega_{01}s + \omega_{01}^2}{s^2 + 2\zeta_1\omega_{01}s + \omega_{01}^2} \cdot \frac{2\zeta_2\omega_{02}s + \omega_{02}^2}{s^2 + 2\zeta_2\omega_{02}s + \omega_{02}^2} \quad \text{[Expression 8]}$$

In function $P_{ML}(s)$ of expression 8, $\omega_{01}$ and $\zeta_1$ represent the vibration frequency and damping ratio, respectively, of one of the two vibrations. $\omega_{02}$ and $\zeta_2$ represent the vibration frequency and damping ratio, respectively, of the other of the two vibrations.

<L. Additional Note>

As described above, the present embodiment and its modified examples include the following disclosure:

(Configuration 1)

A control device (100, 100A) connected to a servo driver (200, 200A, 200B) configured to drive a servomotor (300, 300A, 300B) configured to move a controlled object (2), and configured to output a manipulated variable to the servo driver (200, 200A, 200B) to positionally control the controlled object (2), the control device comprising:

a control means (160, 160A) configured to perform model predictive control for each control period using a dynamics model representing a relationship between the manipulated variable and a position of the controlled object (2) to generate a manipulated variable to be output to the servo driver, the dynamics model including a first dynamics model representing a relationship between the manipulated variable and a position of the servomotor, and a second dynamics model representing a relationship between the position of the servomotor and the position of the controlled object, the second dynamics model being created using a waveform parameter extracted from a vibration waveform of the controlled object, the waveform parameter including a vibration frequency.

(Configuration 2)

The control device (100, 100A) according to configuration 1, wherein the waveform parameter further includes an amplitude ratio of two successive waves in the vibration waveform.

(Configuration 3)

The control device (100, 100A) according to configuration 1 or 2, wherein the control means (160):

inputs a manipulated variable generated before a current control period to the first dynamics model to calculate a predicted position of the servomotor (300, 300A, 300B);

inputs the predicted position of the servomotor (300, 300A, 300B) to the second dynamics model to calculate a predicted position of the controlled object for a future control period elapsing since the current control period ends by a dead time defined in the dynamics model; and uses the predicted position of the controlled object and the dynamics model to generate a manipulated variable to be output to the servo driver (200, 200A, 200B) in a subsequent control period so as to minimize a deviation from a target trajectory of a position assumed by the controlled object in the future control period et. seq.

(Configuration 4)

The control device (100A) according to configuration 1 or 2, wherein the control means (160A) compensates for a predicted position of the servomotor (300, 300A, 300B) based on a feedback value received from the servomotor.

(Configuration 5)

The control device (100, 100A) according to configuration 1 or 2, wherein the control means (160, 160A) includes:

an output means (130) configured to output a characteristic parameter which defines the first dynamics model; and a generation means (150) configured to receive the characteristic parameter and the waveform parameter and generate the manipulated variable to be output to the servo driver.

(Configuration 6)

The control device (100, 100A) according to configuration 1 or 2, wherein the control means (160, 160A) includes:

an output means (130) configured to receive the waveform parameter and output a characteristic parameter which defines the dynamics model composed of the first and second dynamics models combined together; and a generation means (150) configured to receive the characteristic parameter and generate the manipulated variable to be output to the servo driver.

(Configuration 7)

The control device (100, 100A) according to configuration 1 or 2, wherein the control means (160, 160A) includes:
an output means (130) configured to output a characteristic parameter which defines the first dynamics model, and receive a position of the controlled object and output the waveform parameter; and
a generation means (150) configured to receive the characteristic parameter and the waveform parameter and generate the manipulated variable to be output to the servo driver.

(Configuration 8)

The control device (100, 100A) according to any one of configurations 5 to 7, wherein
the control device (100, 100A) includes a processor (102) configured to execute a user program and
the output means (130) and the generation means (150) are implemented by a function block (113, 115) defined in the user program.

(Configuration 9)

A model creation method for creating the second dynamics model used by the control device (100, 100A) according to any one of configurations 1 to 8, the method comprising:
obtaining a vibration waveform of a controlled object;
extracting a waveform parameter from the vibration waveform; and
creating the second dynamics model using the waveform parameter,
the waveform parameter including a vibration frequency.

(Configuration 10)

A control program (112) executed in a control device (100, 100A) connected to a servo driver (200, 200A, 200B) configured to drive a servomotor (300, 300A, 300B) configured to move a controlled object (2), and configured to output a manipulated variable to the servo driver (200, 200A, 200B) to positionally control the controlled object (2),
the control program (112) causing the control device (100, 100A) to:
create a first dynamics model representing a relationship between the manipulated variable and a position of the servomotor (300, 300A, 300B);
use a waveform parameter extracted from a vibration waveform of the controlled object (2) to create a second dynamics model representing a relationship between the position of the servomotor (300, 300A, 300B) and a position of the controlled object (2); and
use the first and second dynamics models to perform model predictive control for each control period to generate a manipulated variable to be output to the servo driver (200, 200A, 200B),
the waveform parameter including a vibration frequency.

While the present invention has been described in embodiments, it should be understood that the embodiments disclosed herein are illustrative and non-restrictive in any respect. The scope of the present invention is defined by the terms of the claims, and is intended to include any modifications within the meaning and scope equivalent to the terms of the claims.

REFERENCE SIGNS LIST

1 control system, 2 controlled object, 3 working plate, 4 first base plate, 5,8 laser displacement meter, 6,9 ball screw, 7 second base plate, 100, 100A control device, 101 field bus, 102 processor, 104 chip set, 106 main memory, 108 flash memory, 110 system program, 110A model creation library, 110B model predictive control library, 112 user program, 112A sequence program, 112B motion program, 113 automatic model creation FB, 113A, 115A start instruction, 113B, 115B sampling period, 113C identifier output, 113D torque, 113E, 115G status, 113F identifier input, 113G, 115D characteristic parameter, 115 model predictive control FB, 115C target position, 115E vibration frequency, 115F amplitude ratio, 115H manipulated variable, 115I prediction error, 116 external network controller, 118 memory card interface, 120 memory card, 122 internal bus controller, 124 field bus controller, 126 I/O Unit, 130 model creation module, 140 trajectory generation module, 150, 150A model predictive control module, 160, 160A control unit, 200, 200X, 200Y servo driver, 300, 300X, 300Y servomotor, 400 first target to be modelled, 402 second target to be modelled.

The invention claimed is:

1. A control device connected to a servo driver configured to drive a servomotor configured to move a controlled object, and configured to output a manipulated variable to the servo driver to control a position of the controlled object, the control device comprising:
a processor; and
a memory storing instructions that, when executed by the processor, cause the processor to at least:
perform model predictive control for each control period using a dynamics model representing a relationship between the manipulated variable and a position of the controlled object to generate the manipulated variable to be output to the servo driver,
the dynamics model including a first dynamics model representing a relationship between the manipulated variable and a position of the servomotor, and a second dynamics model representing a relationship between the position of the servomotor and the position of the controlled object,
the second dynamics model being created using a waveform parameter extracted from a vibration waveform of the controlled object,
the waveform parameter including a vibration frequency.

2. The control device according to claim 1, wherein the waveform parameter further includes an amplitude ratio of two successive waves in the vibration waveform.

3. The control device according to claim 1, wherein the instructions, when executed by the processor, further cause the processor to:
input the manipulated variable generated before a current control period to the first dynamics model to calculate a predicted position of the servomotor;
input the predicted position of the servomotor to the second dynamics model to calculate a predicted position of the controlled object for a future control period elapsing after the current control period ends by a dead time defined in the dynamics model; and
use the predicted position of the controlled object and the dynamics model to generate the manipulated variable to be output to the servo driver in a subsequent control period so as to minimize a deviation from a target trajectory of a position assumed by the controlled object in the future control period and following control periods.

4. The control device according to claim 1, wherein the instructions, when executed by the processor, cause the processor to compensate for a predicted position of the servomotor based on a feedback value received from the servomotor.

5. The control device according to claim 1, wherein the instructions, when executed by the processor, cause the processor to:
output a characteristic parameter which defines the first dynamics model; and
receive the characteristic parameter and the waveform parameter and generate the manipulated variable to be output to the servo driver.

6. The control device according to claim 1, wherein the instructions, when executed by the processor, cause the processor to:
receive the waveform parameter and output a characteristic parameter which defines the dynamics model composed of the first and second dynamics models combined together; and
receive the characteristic parameter and generate the manipulated variable to be output to the servo driver.

7. The control device according to claim 1, wherein the instructions, when executed by the processor, cause the processor to:
output a characteristic parameter which defines the first dynamics model, and receive a measured position of the controlled object and output the waveform parameter; and
receive the characteristic parameter and the waveform parameter and generate the manipulated variable to be output to the servo driver.

8. The control device according to claim 5, wherein
the instructions include a function block causing the processor to output the characteristic parameter and generate the manipulated variable to be output to the servo driver.

9. A model creation method for creating the second dynamics model used by the control device according to claim 1, the model creation method comprising:
obtaining a vibration waveform of a controlled object;
extracting a waveform parameter from the vibration waveform; and
creating the second dynamics model using the waveform parameter,
the waveform parameter including a vibration frequency.

10. A non-transitory computer-readable storage medium storing a control program executed in a control device connected to a servo driver configured to drive a servomotor configured to move a controlled object, and configured to output a manipulated variable to the servo driver to positionally control the controlled object,
the control program, when executed by the control device, causing the control device to at least:
create a first dynamics model representing a relationship between the manipulated variable and a position of the servomotor;
use a waveform parameter extracted from a vibration waveform of the controlled object to create a second dynamics model representing a relationship between the position of the servomotor and a position of the controlled object; and
use the first and second dynamics models to perform model predictive control for each control period to generate the manipulated variable to be output to the servo driver,
the waveform parameter including a vibration frequency.

11. The non-transitory computer-readable storage medium according to claim 10, wherein the waveform parameter further includes an amplitude ratio of two successive waves in the vibration waveform.

12. The non-transitory computer-readable storage medium according to claim 10, wherein the control program, when executed by the control device, further causes the control device to:
input the manipulated variable generated before a current control period to the first dynamics model to calculate a predicted position of the servomotor;
input the predicted position of the servomotor to the second dynamics model to calculate a predicted position of the controlled object for a future control period elapsing after the current control period ends by a dead time defined in the dynamics model; and
use the predicted position of the controlled object and the dynamics model to generate the manipulated variable to be output to the servo driver in a subsequent control period so as to minimize a deviation from a target trajectory of a position assumed by the controlled object in the future control period and following control periods.

13. The non-transitory computer-readable storage medium according to claim 10, wherein the control program, when executed by the control device, further causes the control device to compensate for a predicted position of the servomotor based on a feedback value received from the servomotor.

14. The non-transitory computer-readable storage medium according to claim 10, wherein the control program, when executed by the control device, further causes the control device to:
generate a characteristic parameter which defines the first dynamics model; and
use the characteristic parameter and the waveform parameter to generate the manipulated variable to be output to the servo driver.

15. The non-transitory computer-readable storage medium according to claim 10, wherein the control program, when executed by the control device, further causes the control device to:
use the waveform parameter to generate a characteristic parameter which defines the dynamics model composed of the first and second dynamics models combined together; and
use the characteristic parameter to generate the manipulated variable to be output to the servo driver.

16. The non-transitory computer-readable storage medium according to claim 10, wherein the control program, when executed by the control device, further causes the control device to:
generate a characteristic parameter which defines the first dynamics model;
use a measured position of the controlled object to generate the waveform parameter; and
use the characteristic parameter and the waveform parameter to generate the manipulated variable to be output to the servo driver.

* * * * *